United States Patent
Bokeloh et al.

(10) Patent No.: US 11,607,809 B2
(45) Date of Patent: Mar. 21, 2023

(54) ROBOT MOTION PLANNING ACCOUNTING FOR OBJECT POSE ESTIMATION ACCURACY

(71) Applicant: Intrinsic Innovation LLC, Mountain View, CA (US)

(72) Inventors: Martin Bokeloh, Munich (DE); Stefan Hinterstoisser, Munich (DE); Olivier Pauly, Munich (DE); Hauke Heibel, Höhenkirchen-Siegertsbrunn (DE); Martina Marek, Munich (DE)

(73) Assignee: Intrinsic Innovation LLC, Mountain View, CA (US)

( * ) Notice: Subject to any disclaimer, the term of this patent is extended or adjusted under 35 U.S.C. 154(b) by 175 days.

(21) Appl. No.: 17/131,481

(22) Filed: Dec. 22, 2020

(65) Prior Publication Data
US 2022/0193901 A1    Jun. 23, 2022

(51) Int. Cl.
*B25J 9/16* (2006.01)

(52) U.S. Cl.
CPC ........... *B25J 9/1664* (2013.01); *B25J 9/1692* (2013.01)

(58) Field of Classification Search
CPC ...... B25J 9/1664; B25J 9/1692; B25J 9/1697; G05B 2219/39246; G05B 2219/40564; G05B 2219/40583
See application file for complete search history.

(56) References Cited

U.S. PATENT DOCUMENTS

2017/0160737 A1   6/2017 Towal et al.
2019/0240835 A1*  8/2019 Sorin ..................... B25J 9/1671
2019/0329410 A1  10/2019 Wagner et al.
2020/0001458 A1   1/2020 Schweiz
2021/0023706 A1*  1/2021 Sorin ..................... B25J 13/088
2022/0152825 A1*  5/2022 Hansen .................. B25J 13/089

FOREIGN PATENT DOCUMENTS

WO   WO2019/183141   9/2019
WO   WO2020/056301   3/2020

OTHER PUBLICATIONS

International Search Report and Written Opinion in International Appln. No. PCT/US2021/055423, dated Feb. 7, 2022, 10 pages.

* cited by examiner

*Primary Examiner* — Abby Y Lin
*Assistant Examiner* — Dylan Brandon Mooney
(74) *Attorney, Agent, or Firm* — Fish & Richardson P.C.

(57) ABSTRACT

Methods, systems, and apparatus, including computer programs encoded on computer storage media, for planning robotic movements to perform a given task while satisfying object pose estimation accuracy requirements. One of the methods includes generating a plurality of candidate measurement configurations for measuring an object to be manipulated by a robot; determining respective measurement accuracies for the plurality of candidate measurement configurations; determining a measurement accuracy landscape for the object including defining a high measurement accuracy region based on the respective measurement accuracies for the plurality of candidate measurement configurations; and generating a motion plan for manipulating the object in the robotic process that moves the robot, a sensor, or both, through the high measurement accuracy region when performing pose estimation for the object.

21 Claims, 3 Drawing Sheets

ROBOT MOTION PLANNING ACCOUNTING FOR OBJECT POSE ESTIMATION ACCURACY

BACKGROUND

This specification relates to robotics, and more particularly to planning robotic movements.

Robotics planning refers to sequencing the physical movements of robots in order to perform tasks. For example, an industrial robot that builds cars can be programmed to first pick up a car part and then weld a car part onto the frame of the car. Each of these actions can themselves include dozens or hundreds of individual movements by robot motors and actuators.

Robotics planning has traditionally required immense amounts of manual programming in order to meticulously dictate how the robotic components should move in order to accomplish a particular task. Manual programming is tedious, time-consuming, and error prone. In addition, a plan that is manually generated for one workcell can generally not be used for other workcells. In this specification, a workcell is the physical environment in which a robot will operate. Workcells have particular physical properties, e.g., physical dimensions, and/or layouts, that impose constraints on how robots can move within the workcell. Thus, a manually-programmed plan for one workcell may be incompatible with a workcell having different physical properties and/or layouts.

In many robotics applications, the primary success or failure criteria for a plan is the accuracy in pose estimation of different objects within the workcell by a robot when executing the plan. For example, for a robot to manipulate (e.g., grasp, push, and/or pull) an object, the robot must be able to at least determine from vision data a pose of the object (i.e., determine an orientation, a position, or both of the object with respect to a predetermined coordinate frame, e.g., a robot coordinate frame). As another example, object pose estimation can be utilized by a robot to avoid collision with certain objects when moving within the workcell.

Accurate object pose estimation, however, is a hard perception problem and can even become unsolvable. Additionally, when using manual planning, it is often difficult or impossible to predict how accurately a robot can estimate object poses by executing the plan. Depending on which viewpoint a sensor observes the object, the accuracy of the resulting pose estimation can vary (e.g., deteriorate) significantly. In some cases, only a range of possible poses can be determined due to underlying geometrics characteristics of the object of interest. For example, when using a sensor to observe a cup where the handle is occluded from the field of view of the sensor, a robot will not be able to estimate the actual orientation of the cup, e.g., in terms of rotation angle values.

SUMMARY

This specification generally describes how a system can generate a plan for one or more robots in a workcell that satisfies accuracy requirements of pose estimations of objects of interest from sensor data. As used herein, the term "plan" generally refers to a motion plan for performing a particular task with a robot and a sensor. The plan can define a sequence of robot movements or a sequence of joint configurations that are required to perform the particular task, e.g., by defining a path between a starting point and an end point including multiple waypoints there between that each correspond to a particular pose of the robot. The term "pose" generally refers to the position of an object in an environment (e.g., x, y, and z coordinates of the object), and can additionally include information about the orientation of the object (e.g., rotation of the object about the x, y, and z axes). The pose of the object can be defined with reference to a given, real-world coordinate frame.

In some implementations, a robot planning system requires in-process observations of certain objects in the workcell while the robots in the workcell move to complete a task, in order to plan future movements of the robots. In-process observations can be required by any robot planning system that follows a sequence of "observe, plan, move, observe," where the robot planning system iteratively observes the current state of the workcell and moves according to the captured observations.

As a particular example, a first robot may need to apply a glue bead to a piece of sheet metal that is not well-fixtured; that is, the piece of sheet metal is not fully supported, so that parts of the piece of sheet metal are slightly warped while the first robot is applying the glue bead. The robot planning system might generate two plans to accomplish this task: a first plan that positions the robots and the piece of sheet metal, and a second plan that executes the application of the glue bead.

The first plan can be pre-generated by the robot planning system, and can be used to position the robots in the workcell for the first robot to apply the glue bead. Then, the path of the first robot as it applies the glue bead, as well as subsequent movements of other robots in the workcell, may depend on the particular placement of the piece of sheet metal and the degree to which the piece of sheet metal is warped; these variables may be slightly different following different executions of the first plan.

The robot planning system can generate the second plan for the workcell after the robots have already been properly positioned, so that the second plan can dictate how the first robot applies the glue bead and how the other robots move around the positioned piece of sheet metal. In order to generate the second plan, the robot planning system can require up-to-date measurements of the current state of the workcell captured by one or more sensors in the workcell. The up-to-date measurements provide information about the particular pose of the piece of sheet metal including the placement of the piece and the degree to which the piece is warped to the robot planning system, so that the system can plan the movements of the robots in the second plan accordingly.

Thus, the pre-generated first plan must ensure that the piece of sheet metal is measurable by the sensors in the workcell, i.e., must ensure that the actual pose (e.g., position, orientation, or both) of the piece of sheet metal can be accurately determined from sensor data.

Particular embodiments of the subject matter described in this specification can be implemented so as to realize one or more of the following advantages.

The techniques described in this specification allow a system to automatically generate a plan that satisfies each specified accuracy requirements.

The system can automatically generate a plan for the given robotics task by moving an arbitrary number of robots and, optionally, an arbitrary number of sensors. Using techniques described in this specification can dramatically reduce the amount of manual programming required in order to program robots while satisfying accuracy requirements of object pose estimation from sensor data.

The described techniques can allow for the system to generate high-quality plans in challenging environments where manual programming is made particularly difficult, e.g., in environments that include objects with perplexing geometric shapes, or objects that are (partially) occluded from the field of view of a stationary sensor. For example, the described techniques can allow for the system to generate plans with higher accuracy, fewer failures, or both. Such high-quality plans in turn allow for the robots to effectively perform the given task while satisfying the pose estimation accuracy requirements.

Using techniques described in this specification can also improve flexibility in robot planning because fixtures, e.g., object-specific clamps, that are conventionally used to hold movable objects in predefined poses are no longer required. Instead, the system can generate a plan to move the robots, the sensors, or both by ensuring that the sensors capture precisely the observation of an object of interest in such a way that the actual pose of the object is clearly interpretable.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
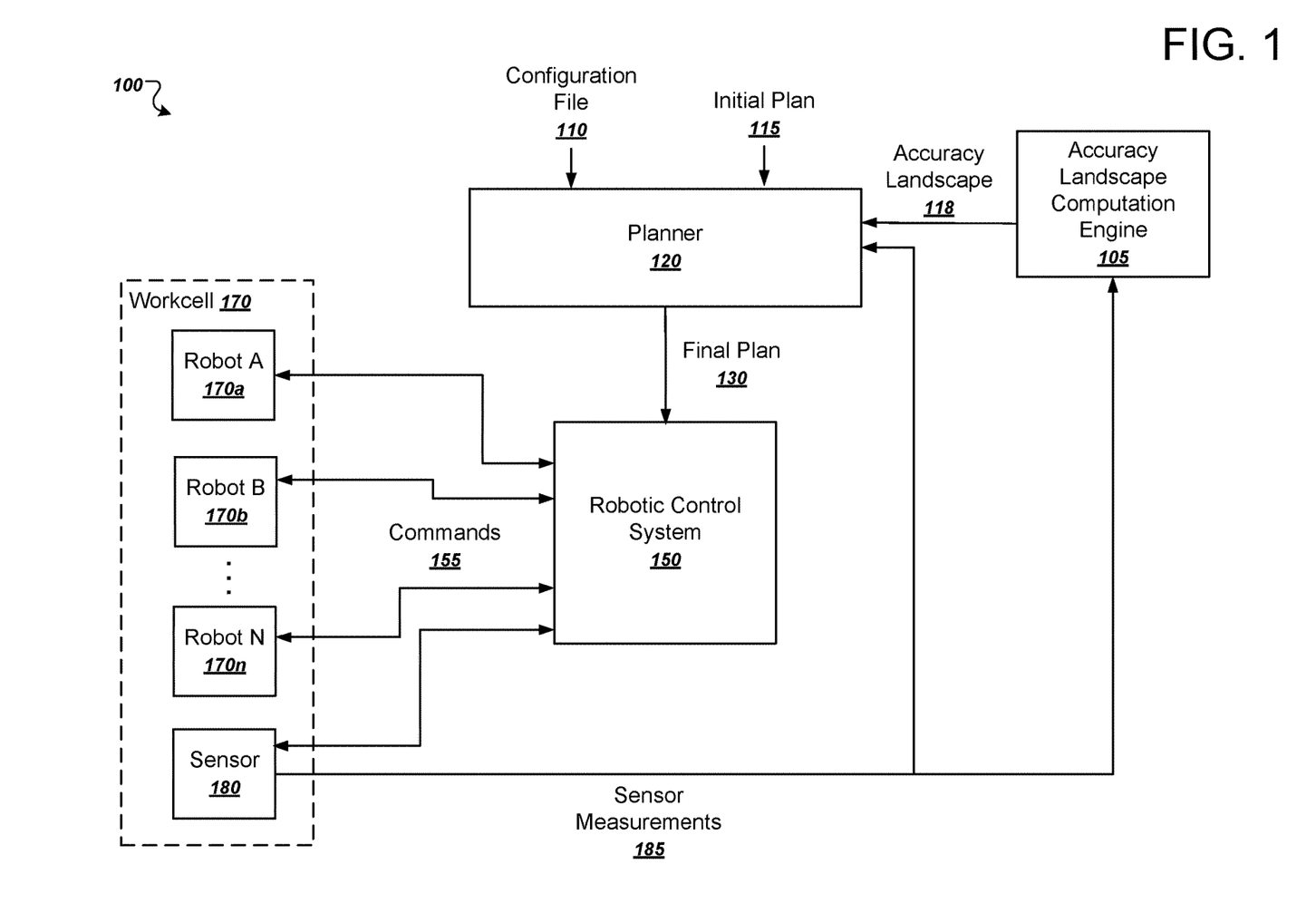
FIG. 1 is a diagram that illustrates an example system.

FIG. 1 is a diagram that illustrates an example system 100. The system 100 is an example of a system that can implement the techniques described in this specification.

The system 100 includes a number of functional components, including an accuracy landscape computation engine 105, a planner 120 and a robotic control system 150. Each of these components can be implemented as computer programs installed on one or more computers in one or more locations that are coupled to each other through any appropriate communications network, e.g., an intranet or the Internet, or combination of networks. The system 100 also includes a workcell 170 that includes N robots 170a-n and a sensor 180.

The robotic control system 150 is configured to control the robots 170a-n in the workcell 170. The sensor 180 is configured to capture measurements of the workcell 170. The sensor 180 can be any device that can take measurements of a current state of the workcell 170, e.g., a camera sensor, a lidar sensor, a distance sensor, a force sensor, an infrared sensor, or the like. As illustrated in FIG. 1, the workcell 170 only has one sensor 180. In some implementations, however, there can be multiple sensors in the workcell 170, where different sensors are of a similar or different type, in a different position in the workcell 170, and/or differently configured than the other sensors in the workcell 170. For example, each robot can have one or more sensors, and each sensor can be attached to an end of a robot arm. As another example, the sensors can be mounted on stationary or movable surfaces in the workcell 170.

The overall goal of the planner 120 is to generate a plan that allows the robotic control system 150 to execute one or more tasks, while ensuring that the sensor 180 is able to capture certain desired observations of the workcell 170, i.e., observations that facilitate accurate pose estimations of different objects of interest within the workcell 170 and thereby facilitate effective task performance.

To generate the plan, the planner 120 consumes accuracy landscape information 118 generated by the accuracy landscape computation engine 105. This information generally provides insights into how accurately a pose of the object can be determined when the robot is in different measurement configurations. Generating the accuracy landscape information 118 and generating the plan based on this information is described in more detail below with reference to FIGS. 2-3.

In some cases, the planner 120 receives a configuration file 110. The configuration file 110 can be generated by a user. The configuration file 110 can specify the required tasks to be completed by the robots in the workcell 170. The configuration file 110 can specify the desired observations, e.g., in terms of image pixels, that must be captured by the sensor 180. The configuration file 110 can also specify the required accuracy of object pose estimation from observations captured by the sensor 180. For example, the accuracy can be defined in terms of distances (e.g., Cartesian distances), angles (e.g., Euclidean angles), or both.

For example, the configuration file 110 can specify that a particular region of an object located within the workcell 170 must be observable by the sensor 180 at all times; e.g., if the sensor 180 is a camera, the specified region must be visible to the sensor 180 throughout the execution of the plan generated by the planner 120.

As another example, the configuration file 110 can specify that a particular region of an object located within the workcell 170 must be observable by the sensor 180 at a particular time; e.g., the sensor 180 must be able to observe a piece after it has been placed atop a processing station but before work is done on the piece by the robots. At other times, however, the specified piece need not be observable by the sensor 180. In some such examples, the configuration file 110 can further specify that the observations should be captured by one or more sensors of the workcell 170 in a way such that a pose of the object is precisely measurable from observations. The configuration file 110 can additionally specify a required accuracy of the pose estimation of the object, i.e., a maximum degree of error of the estimated pose with respect to the actual, ground truth pose of the object.

In some cases, the planner 120 receives an initial plan 115 that was generated offline. The initial plan can include the robot maneuvering through a volumetric region of a workcell. The initial plan can include moving the robot from a starting point to an end point to perform a task, e.g., the same task as the one specified in the configuration file 110.

In some examples, during online operation, the system may determine that the initial plan requires modification. For example, the initial plan may include moving the robot to an end point to begin manipulating (e.g., grasping, pushing, and/or pulling) an object. The system may determine that a current pose of the object is not measurable from the sensor observations. The system can then adapt the initial plan to move the robot, the sensor, or both to a new location where the sensor is able to capture new observations from which the pose of the object can be precisely determined. By ensuring accurate pose estimation of different objects that the robots may interact with when executing the plan, the system can generally control the robots to more effectively perform the given robotics task.

The planner 120 uses the accuracy landscape information 118 and, in some cases, the configuration file 110, the initial plan 115, or both to generate a final plan 130 for the robotic control system 150 that, when executed by the robots in the workcell 170, accomplishes the tasks specified in the configuration file 110 while also satisfying the pose estimation accuracy requirements. In particular, during execution of the final plan 130, the sensor 180 is able to capture all measurements that can meet the pose estimation accuracy requirements in the configuration file 110.

As will be described in more detail below in reference to FIGS. 2-3, the planner 120 can do this by automatically searching through an entire configuration space of the robots to determine the final plan 130. The configuration space of a robot refers to the space of all possible robot poses (e.g., position, orientation, or both) the robot may attain. On the contrary, manually programming the movements for the robots to complete the task while ensuring object pose estimation accuracy is difficult, as the search space in a 6D coordinate system is very large and cannot be searched exhaustively in a reasonable amount of time.

The planner 120 gives the final plan 130 to the robotic control system 150. In some implementations, the planner 120 is an offline planner. That is, the planner 120 can provide the final plan 130 to the robotic control system 150 before the robotic control system 150 executes any operations, and the planner 120 does not receive any direct feedback from the robotic control system 150. In some such implementations, the planner 120 can be hosted offsite at a data center separate from the robotic control system 150.

In some other implementations, the planner 120 can be an online planner. That is, the robotic control system can receive the final plan 130 and begin execution, and provide feedback on the execution to the planner 120. The planner 120 can respond to feedback from the robotic control system 150, and generate a new final plan in response to the feedback.

The robotic control system 150 executes the final plan by issuing commands 155 to the workcell 170 in order to drive the movements of the robots 170a-n.

The robotic control system 150 can also issue commands 155 to the sensor 180. For example, the commands 155 can identify particular times at which the sensor 180 should capture certain desired observations of the workcell 170. In some implementations, the sensor 180 can also be moved within the workcell 170. For example, the sensor 180 can be attached to a robotic arm that can move the sensor to different positions throughout the workcell 180 in order to capture certain desired observations. In these implementations, the robotic control system 150 can issue commands 155 that specify an orientation and/or position of the sensor 180 for each desired observation.

While the robots 170a-n in the workcell 170 are executing the commands 155, the sensor 180 can capture sensor measurements 185 identified in the commands 155 and send the sensor measurements 185 to other components of the system 100.

In particular, the sensor 180 can send the sensor measurements 185 to the planner 120. The planner 120 can use the sensor measurements 185 to generate a plan for subsequent movements of the robots in the workcell 170. For example, the planner 120 can use the sensor measurements 185 to know precisely where each object in the workcell 170 is currently located and/or oriented, and thus build a new plan for the robots in the workcell 170 to move without colliding with any other object of the workcell 170.

Figure 2:
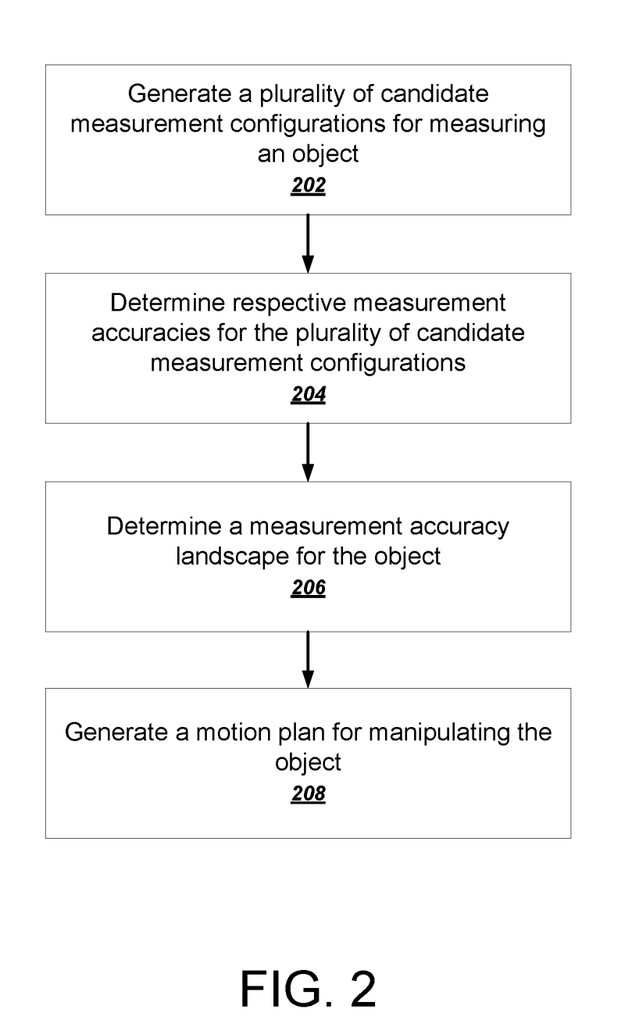
FIG. 2 is a flowchart of an example process for generating a plan for a robot.

FIG. 2 is a flowchart of an example process 200 for generating a plan for a robot in a robotic operating environment to accomplish a particular task while satisfying an object pose estimation accuracy requirement. The object pose estimation accuracy requirement can require that a sensor in the robotic operating environment capture a certain desired observation of an object in the robotic operating environment during execution of the plan. The process 200 can be implemented by one or more computer programs installed on one or more computers and programmed in accordance with this specification. For example, the process 200 can be performed by a system including the accuracy landscape computation engine 105 and the planner 120 depicted in FIG. 1. For convenience, the process will be described as being performed by a system of one or more computers.

In general the system can repeatedly perform the process 200 for every object of interest in the robotic operating environment, e.g., for every object to be manipulated by a robot in a robotic process.

The system generates a plurality of candidate measurement configurations for measuring an object to be manipulated by a robot in a robotic process (202). The system can measure the object using one or more sensors of the robotic operating environment. In some implementations, the sensor can be a stationary sensor that is affixed to a surface, and measurement of the object can be done by using the robot to move the object into the field of view of the sensor. In some implementations, the sensor itself can be moved. For example, the sensor can be attached to an arm of the robot, and measurement of the object can be done by using the robot to move the sensor into a particular spatial position so that the object is observable by the sensor attached to the robot arm. The robot can hold the object or the sensor at different measurement configurations, and the sensor can observe the same object from multiple angles, thereby yielding different pose estimation accuracies. For example, more accurate object poses can be usually be determined in cases where the object is fully observable by the sensor, compared with other cases where the object is at least partially obscured from the sensor.

Depending on the actual of the make or type of the robot, the exact representation of the measurement configurations may vary, but typically, each measurement configuration of the robot can be parameterized by one or more or translational parameters (corresponding to prismatic joints of the robot) and/or one or more rotational parameters (corresponding to revolute joints of the robot). Each such parameters is associated with one or more real-valued numeric values that generally define how, or in what magnitude, the spatial relationship corresponding to the parameter should be applied in defining a particular measurement configuration of the robot, i.e., how the robot is holding the object or the sensor in the space of the robotic operating environment.

The system can generate the plurality of candidate measurement configurations by sampling a fixed (e.g., user-specified) number of candidate measurement configurations from a predetermined measurement space. The predetermined measurement space can be a known configuration space of the robot, i.e., a space of all possible robot poses the robot may attain in context of observing the object using one or more sensors. For example, the predetermined measurement space can be parameterized by the range of possible real-valued numeric values associated with each translational and/or rotational parameters, and generating the candidate measurement configurations can involve repeatedly sampling different numeric values from each of the set of possible values. For example, the system can perform the sampling with uniform randomness. As another example, the system can perform the sampling by using Poisson disk sampling technique, icosahedron subdivision technique, stratified sampling technique, or a combination thereof. In some such examples, exploration noise can be added to the plurality of sampled candidate measurement configurations to avoid undesired aliasing effects, and the amount of noise can be dependent on the actual sampling technique in use, e.g., can be proportional to the value of the sampling density radius in Poisson disk sampling technique.

Different candidate measurement configurations of the robot generated in this way generally result in different observations to be captured by using the sensors. For example, one of the sensors can be a camera sensor that is configured to capture images of the object from which a pose of the object can be estimated such as by analyzing the images using image processing and/or computer vision techniques to determine the pose of the object shown therein. Appropriate image processing and/or computer vision techniques include image segmentation, object detection/classification, and object pose estimation techniques, to name just a few examples.

In some implementations, the system can discard some sampled candidate measurement configurations, for example discarding candidate measurement configurations that result in sensor observations that are not viable for pose estimation (e.g., observations that were captured by a covered sensor whose field of view was blocked by an object in contact with or in very close proximity to the lens of the sensor).

The system determines, with respect to a ground truth object pose, respective measurement accuracies of the estimated object poses corresponding to the plurality of candidate measurement configurations (204). Collectively, the respective measurement accuracies provide insights into how accurately a pose of the object can be determined when the robot is in different measurement configurations. This is described in more detail below with reference to FIG. 3.

The system determines a measurement accuracy landscape for the object including defining a high measurement accuracy region based on the respective measurement accuracies for the plurality of candidate measurement configurations (206).

The measurement accuracy landscape can be parameterized by the translational parameters and/or the rotational parameters that have been used to define the candidate measurement configurations of the robot. Alternatively, for simplicity the measurement accuracy landscape can be parameterized by only a subset of the translational/rotational parameters, e.g., by only two rotational parameters.

The system can generate the measurement accuracy landscape in form of a multi-dimensional representation. The multi-dimensional representation is a representation that enables visualization of different measurement configurations of the robot in the real-world, robotic operating environment with respect to the representation. In other words, the system models the configuration space of the robot in context of object observation as a multi-dimensional representation. Every point on the modeled representation corresponds to a possible configuration of the robot when capturing observations of the object using the sensors. Every point on the modeled representation can be associated with multiple degrees of freedom that collectively define a robot pose of the robot in the robotic operating environment. The modeled representation can have any of a variety of sizes, shapes, or dimensions.

For example, the measurement accuracy landscape can be in form of a 2-D image where the object corresponds to a particular position, e.g., the center point, on the 2-D image, and different measurement configurations of the robot are mapped to different pixels on the 2-D image. As another example, the measurement accuracy landscape can be in form of a 3-D sphere of a volumetric region surrounding the object, and each different measurement configurations of the robot are mapped to different 3-D positions on the surface of the 3-D sphere. In some such examples, in addition to or instead of defining one-to-one correspondence between a measurement configuration of the robot and a position on the measurement accuracy landscape, each position on the measurement accuracy landscape can be mapped to a range of measurement configurations in close proximity to a corresponding measurement configuration of the robot.

The system defines, on the measurement accuracy landscape, one or more high measurement accuracy regions. The positions contained within each high measurement accuracy region corresponds to certain measurement configurations of the robot that facilitate desired observations to be captured by the sensors from which a pose of the object can be precisely determined. In other words, the estimated pose of the object determined from each such desired observation is within a predetermined threshold difference from the ground truth object pose.

For example, the system can do this by assigning one or more color values to each position on the measurement accuracy landscape. Different color values can represent different pose estimation accuracies as determined from step 204, for example warmer colors can indicate higher estimation accuracy (and, correspondingly, smaller errors from the ground truth object pose) while colder colors can indicate lower estimation accuracy. Different color values can additionally represent different error sources, for example warmer colors can indicate greater distance errors while colder colors can indicate greater angle errors.

In a similar manner, the system can also define, on the measurement accuracy landscape, one or more low measurement accuracy regions. The positions contained within each low measurement accuracy region corresponds to certain measurement configurations of the robot that result in undesired observations to be captured by the sensors from which a pose of the object cannot be accurately determined.

The system can further adjust respective sizes of the accuracy regions to account for possible variances associated with the object pose estimation, for example by shrinking the size of the high measurement accuracy regions on the measurement accuracy landscape.

The system generates a plan for manipulating the object in the robotic process that moves the robot, a sensor, or both, through the high measurement accuracy region when performing pose estimation for the object (208) during execution of the task. The system can generate the plan either from scratch or from an initial plan, i.e., to modify the initial plan to generate a final plan.

In particular, the system generates the plan for moving the robot in the robotic operating environment in accordance with the information contained in the measurement accuracy landscape. The plan can specify that, at various time points during task execution that require object pose estimation, the sensors should capture observations of the object only when the robot is at certain measurement configurations corresponding to positions within the high measurement accuracy regions. The plan can avoid capturing observations of the object insofar as a current measurement configuration of the robot maps to a position within the low measurement accuracy regions as defined with reference to the measurement accuracy landscape. As such, effective task performance can be ensured by following the plan.

By executing the plan, for example, the system can control the robot to place the sensor to observe the object from a particular angle such that its pose can be precisely determined. As another example, the system can avoid controlling the robot to place the sensor within a spatial region in the robotic operating environment in which the object would be occluded from the field of view of the sensor. In some such examples, doing so can involve the system making online adjustments to an initial plan, i.e., adjusting robot movements that were generated offline to generate alternative movements that can facilitate desired observations to be captured by using the sensors.

In some implementations, the system can select a point within a high measurement accuracy region from the measurement accuracy landscape and use the planner to automatically find a plan that moves the robot, the sensor, or both, through a spatial region in the robotic operating environment corresponding to the selected point in the high measurement accuracy region.

In some implementations, the system can generate a plurality of candidate plans for operating the robot in the robotic process and thereafter select, as the final plan, a selected plan from the plurality of candidate plans. The goal of the final plan is to accomplish the particular task using the robot in the robotic operating environment while satisfying the object pose estimation accuracy requirements. However, each candidate plan does not necessarily accomplish the task and/or satisfy the object pose estimation accuracy requirements.

In such implementations, the system can generate the plurality of candidate plans based on using the robot configuration sampling techniques similarly described above with reference to step 202. Candidate plans containing infeasible or otherwise dangerous robot movements (e.g., movements that will likely result in robot self-collision or collision against other obstacles) may be discarded.

For each of the plurality of candidate plans, the system first assigns a score that is indicative of a maximum measurement accuracy achievable by the robot when performing pose estimation for the object. Specifically, the system can determine the score based on a spatial relation of the candidate plan with respect to the measurement accuracy landscape, for example assigning higher scores to candidate plans that move the robot through the high measurement accuracy regions on the measurement accuracy landscape. The system can also determine the score based on other suitable metrics for quality evaluation of the candidate plan including, for example, task performance, robot swept volume, robot travel distance, e.g., in terms of joint distance or Cartesian distance, and the like when executing the candidate plan. Next, the system identifies, according to the scores, a candidate plan from the plurality of candidate plans as the final plan for manipulating the object in the robotic process. For example, the system can select the candidate plan to which the highest score has been assigned.

Figure 3:
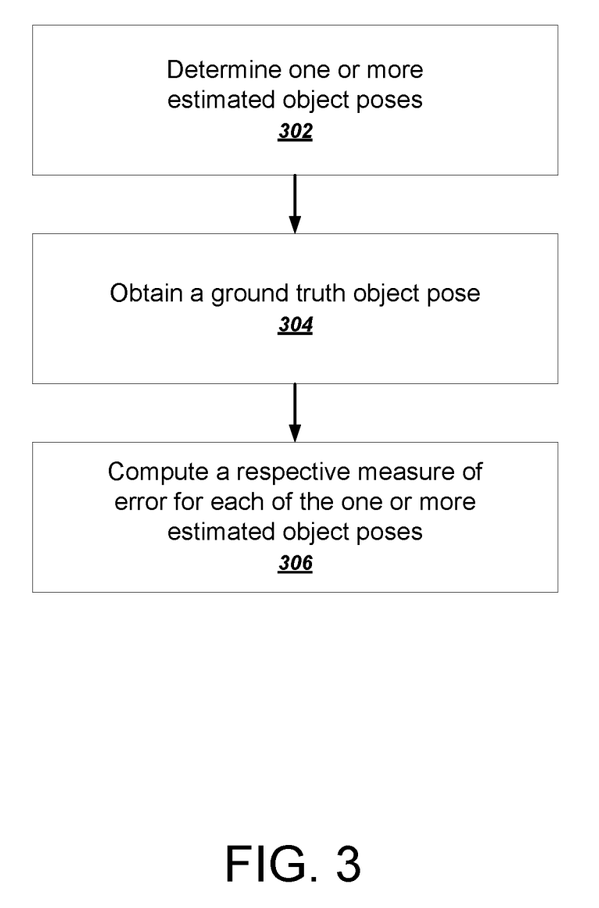
FIG. 3 is a flowchart of an example process for determining a measurement accuracy landscape for an object.

FIG. 3 is a flowchart of an example process 300 for determining a measurement accuracy landscape for an object. The process 300 can be implemented by one or more computer programs installed on one or more computers and programmed in accordance with this specification. For example, the process 300 can be performed by a system including the accuracy landscape computation engine 105 and the planner 120 depicted in FIG. 1. For convenience, the process will be described as being performed by a system of one or more computers.

In general, the system can repeatedly perform the process 300 for each of the plurality of candidate measurement configurations.

The system determines one or more estimated object poses (302) based on analysis of features in the one or more observations captured by the sensors when the robot is in a particular candidate measurement configuration. To derive the object pose from the one or more observations, the system can run a same pose estimation algorithm on different sensor observations, or different pose estimation algorithms on different sensor observations. For example, multiple sensors may be positioned at different locations in the robotic operating environment, and each sensor may observe the object from a respective angle, i.e., when the robot is in the same particular candidate measurement configuration. For example, the sensors may include a movable camera sensor that is attached to a robot arm and that is configured to capture images of the object, and the system may determine an estimated pose of the object by analyzing the images using image processing and/or computer vision techniques to determine the pose of the object shown therein.

The system obtains a ground truth pose of the object (304), which can be determined in any of a variety of ways. For example, the ground truth object pose can be determined by tracking the movable sensor using a motion capture ("Mocap") system, measuring the pose of the static object via a commercial measurement system, and then deriving ground truth pose from measurements. As another example, the ground truth object pose can be determined by refining (i.e., adjusting) the estimated object poses using RANSAC algorithm with respect to the robot. As yet another example, the ground truth object pose can be determined by refining the estimated object poses using force sensor measurements obtained by operating the robot to touch different surfaces of the object using a force sensor attached to a robot arm.

The system computes a respective measure of error for each of the one or more estimated object poses with respect to the ground truth object pose (306). A smaller error in turn indicates a higher object pose estimation accuracy. For example, the error can be defined in terms of distances (e.g., Cartesian distances), angles (e.g., Euclidean angles), or both. In implementations where multiple pose estimations have been determined for the object shown in the sensor observation, the system can additionally compute a combined error measure for the particular candidate measurement configuration. For example, by aggregating the respective measures of error, the system can determine an average error, a maximum/minimum error, or an estimated distribution of the errors associated with the particular candidate measurement configuration. This error information that provides insights into how accurately a pose of the object can be determined when the robot is in different measurement configurations is thereafter used by the system in automatically generating the measurement accuracy landscape for the object, including defining high measurement accuracy regions and, optionally, low measurement accuracy regions therein.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the robotic control system 150 of FIG. 1.

The software stack can include multiple levels of increasing hardware specificity in one direction and increasing software abstraction in the other direction. At the lowest level of the software stack are robot components that include devices that carry out low-level actions and sensors that report low-level statuses. For example, robots can include a variety of low-level components including motors, encoders, cameras, drivers, grippers, application-specific sensors, linear or rotary position sensors, and other peripheral devices. As one example, a motor can receive a command indicating an amount of torque that should be applied. In response to receiving the command, the motor can report a current position of a joint of the robot, e.g., using an encoder, to a higher level of the software stack.

Each next highest level in the software stack can implement an interface that supports multiple different underlying implementations. In general, each interface between levels provides status messages from the lower level to the upper level and provides commands from the upper level to the lower level.

Typically, the commands and status messages are generated cyclically during each control cycle, e.g., one status message and one command per control cycle. Lower levels of the software stack generally have tighter real-time requirements than higher levels of the software stack. At the lowest levels of the software stack, for example, the control cycle can have actual real-time requirements. In this specification, real-time means that a command received at one level of the software stack must be executed and optionally, that a status message be provided back to an upper level of the software stack, within a particular control cycle time. If this real-time requirement is not met, the robot can be configured to enter a fault state, e.g., by freezing all operation.

At a next-highest level, the software stack can include software abstractions of particular components, which will be referred to motor feedback controllers. A motor feedback controller can be a software abstraction of any appropriate lower-level components and not just a literal motor. A motor feedback controller thus receives state through an interface into a lower-level hardware component and sends commands back down through the interface to the lower-level hardware component based on upper-level commands received from higher levels in the stack. A motor feedback controller can have any appropriate control rules that determine how the upper-level commands should be interpreted and transformed into lower-level commands. For example, a motor feedback controller can use anything from simple logical rules to more advanced machine learning techniques to transform upper-level commands into lower-level commands. Similarly, a motor feedback controller can use any appropriate fault rules to determine when a fault state has been reached. For example, if the motor feedback controller receives an upper-level command but does not receive a lower-level status within a particular portion of the control cycle, the motor feedback controller can cause the robot to enter a fault state that ceases all operations.

At a next-highest level, the software stack can include actuator feedback controllers. An actuator feedback controller can include control logic for controlling multiple robot components through their respective motor feedback controllers. For example, some robot components, e.g., a joint arm, can actually be controlled by multiple motors. Thus, the actuator feedback controller can provide a software abstraction of the joint arm by using its control logic to send commands to the motor feedback controllers of the multiple motors.

At a next-highest level, the software stack can include joint feedback controllers. A joint feedback controller can represent a joint that maps to a logical degree of freedom in a robot. Thus, for example, while a wrist of a robot might be controlled by a complicated network of actuators, a joint feedback controller can abstract away that complexity and exposes that degree of freedom as a single joint. Thus, each joint feedback controller can control an arbitrarily complex network of actuator feedback controllers. As an example, a six degree-of-freedom robot can be controlled by six different joint feedback controllers that each control a separate network of actual feedback controllers.

Each level of the software stack can also perform enforcement of level-specific constraints. For example, if a particular torque value received by an actuator feedback controller is outside of an acceptable range, the actuator feedback controller can either modify it to be within range or enter a fault state.

To drive the input to the joint feedback controllers, the software stack can use a command vector that includes command parameters for each component in the lower levels, e.g., a positive, torque, and velocity, for each motor in the system. To expose status from the joint feedback controllers, the software stack can use a status vector that includes status information for each component in the lower levels, e.g., a position, velocity, and torque for each motor in the system. In some implementations, the command vectors also include some limit information regarding constraints to be enforced by the controllers in the lower levels.

At a next-highest level, the software stack can include joint collection controllers. A joint collection controller can handle issuing of command and status vectors that are exposed as a set of part abstractions. Each part can include a kinematic model, e.g., for performing inverse kinematic calculations, limit information, as well as a joint status vector and a joint command vector. For example, a single joint collection controller can be used to apply different sets of policies to different subsystems in the lower levels. The joint collection controller can effectively decouple the relationship between how the motors are physically represented and how control policies are associated with those parts. Thus, for example if a robot arm has a movable base, a joint collection controller can be used to enforce a set of limit policies on how the arm moves and to enforce a different set of limit policies on how the movable base can move.

At a next-highest level, the software stack can include joint selection controllers. A joint selection controller can be responsible for dynamically selecting between commands being issued from different sources. In other words, a joint selection controller can receive multiple commands during a control cycle and select one of the multiple commands to be executed during the control cycle. The ability to dynamically select from multiple commands during a real-time control cycle allows greatly increased flexibility in control over conventional robot control systems.

At a next-highest level, the software stack can include joint position controllers. A joint position controller can receive goal parameters and dynamically compute commands required to achieve the goal parameters. For example, a joint position controller can receive a position goal and can compute a set point for achieve the goal.

At a next-highest level, the software stack can include Cartesian position controllers and Cartesian selection controllers. A Cartesian position controller can receive as input goals in Cartesian space and use inverse kinematics solvers to compute an output in joint position space. The Cartesian selection controller can then enforce limit policies on the results computed by the Cartesian position controllers before passing the computed results in joint position space to a joint position controller in the next lowest level of the stack. For example, a Cartesian position controller can be given three separate goal states in Cartesian coordinates x, y, and z. For some degrees, the goal state could be a position, while for other degrees, the goal state could be a desired velocity.

These functionalities afforded by the software stack thus provide wide flexibility for control directives to be easily expressed as goal states in a way that meshes naturally with the higher-level planning techniques described above. In other words, when the planning process uses a process definition graph to generate concrete actions to be taken, the actions need not be specified in low-level commands for individual robotic components. Rather, they can be expressed as high-level goals that are accepted by the software stack that get translated through the various levels until finally becoming low-level commands. Moreover, the actions generated through the planning process can be specified in Cartesian space in way that makes them understandable for human operators, which makes debugging and analyzing the schedules easier, faster, and more intuitive. In addition, the actions generated through the planning process need not be tightly coupled to any particular robot model or low-level command format. Instead, the same actions generated during the planning process can actually be executed by different robot models so long as they support the same degrees of freedom and the appropriate control levels have been implemented in the software stack.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
generating a plurality of candidate measurement configurations for measuring an object to be manipulated by a robot in a robotic process;
determining respective measurement accuracies for the plurality of candidate measurement configurations, comprising, for each of the plurality of candidate measurement configurations:
determining one or more estimated object poses;
obtaining a ground truth object pose; and
computing a respective measure of error for each of the one or more estimated object poses with respect to the ground truth object pose;
determining a measurement accuracy landscape for the object including defining a high measurement accuracy region based on the respective measurement accuracies for the plurality of candidate measurement configurations; and
generating a motion plan for manipulating the object in the robotic process that moves the robot, a sensor, or both, through the high measurement accuracy region when performing pose estimation for the object.

Embodiment 2 is the method of embodiment 1, wherein the object pose specifies a position and an orientation of the object with reference to a predetermined coordinate frame.

Embodiment 3 is the method of any one of embodiments 1 or 2, wherein measuring the object comprises the robot moving the object within a field of view of a sensor affixed to a stationary surface.

Embodiment 4 is the method of any one of embodiments 1-3, wherein measuring the object comprises the robot moving a sensor attached to an arm of the robot to capture observations of the object.

Embodiment 5 is the method of any one of embodiments 1-4, wherein each candidate measurement configuration is defined by one or more or translational parameters and/or one or more rotational parameters.

Embodiment 6 is the method of any one of embodiments 1-5, wherein obtaining the ground truth object pose comprises computing the ground truth object pose from external measurements and by using RANSAC algorithm.

Embodiment 7 is the method of any one of embodiments 1-6, wherein obtaining the ground truth object pose comprises computing the ground truth object pose from force sensor measurements.

Embodiment 8 is the method of any one of embodiments 1-7, wherein generating the plurality of candidate measurement configurations for measuring the object comprises:
sampling the plurality of candidate measurement configurations from a predetermined measurement space by using one or more of Poisson disk sampling, icosahedron subdivision, or stratified sampling technique.

Embodiment 9 is the method embodiment 8, wherein generating the plurality of candidate measurement configurations for measuring the object further comprises:
adding noise to the plurality of sampled candidate measurement configurations.

Embodiment 10 is the method of any one of embodiments 1-9, wherein determining the measurement accuracy landscape for the object comprises:
adjusting a size of the high measurement accuracy region on the measurement accuracy landscape to account for an estimated variance in the estimated object pose.

Embodiment 11 is the method of any one of embodiments 1-10, wherein determining the measurement accuracy landscape for the object further comprises defining a low measurement accuracy region entry into which by the robot should be avoided when performing pose estimation for the object.

Embodiment 12 is the method of any one of embodiments 1-11, wherein defining the high measurement accuracy region based on the respective measurement accuracies for the plurality of candidate measurement configurations comprises:

selecting, from the plurality of candidate measurement configurations for measuring the object, one or more selected measurement configurations associated with respective measurement accuracies that satisfy a predetermined threshold.

Embodiment 13 is the method of any one of embodiments 1-12, wherein generating the motion plan for manipulating the object in the robotic process that moves the robot, the sensor, or both, through the high measurement accuracy region when performing pose estimation for the object comprises:

generating a plurality of candidate motion plans for manipulating the robot in the robotic process;

for each of the plurality of candidate motion plans:
assigning, based on a spatial relation of the candidate motion plan with respect to the measurement accuracy landscape, a score that is indicative of a maximum measurement accuracy achieved by the robot when performing pose estimation for the object; and
identifying, according to the scores, a candidate motion plan as the motion plan for manipulating the object in the robotic process.

Embodiment 14 is the method of embodiment 13, wherein the score is further indicative of an overall robot travel distance specified by the motion plan.

Embodiment 15 is a system comprising: one or more computers and one or more storage devices storing instructions that are operable, when executed by the one or more computers, to cause the one or more computers to perform the method of any one of embodiments 1 to 14.

Embodiment 16 is a computer storage medium encoded with a computer program, the program comprising instructions that are operable, when executed by data processing apparatus, to cause the data processing apparatus to perform the method of any one of embodiments 1 to 14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
generating a plurality of candidate measurement configurations for measuring an object to be manipulated by a robot in a robotic process;
determining respective measurement accuracies for the plurality of candidate measurement configurations, comprising, for each of the plurality of candidate measurement configurations:
determining one or more estimated object poses;
obtaining a ground truth object pose; and
computing a respective measure of error for each of the one or more estimated object poses with respect to the ground truth object pose;
determining a measurement accuracy landscape for the object including defining a high measurement accuracy region based on the respective measurement accuracies for the plurality of candidate measurement configurations; and
generating a motion plan for manipulating the object in the robotic process that moves the robot, a sensor, or both, through the high measurement accuracy region when performing pose estimation for the object.

2. The method of claim 1, wherein the object pose specifies a position and an orientation of the object with reference to a predetermined coordinate frame.

3. The method of claim 1, wherein measuring the object comprises the robot moving the object within a field of view of a sensor affixed to a stationary surface.

4. The method of claim 1, wherein measuring the object comprises the robot moving a sensor attached to an arm of the robot to capture observations of the object.

5. The method of claim 1, wherein each candidate measurement configuration is defined by one or more or translational parameters and/or one or more rotational parameters.

6. The method of claim 1, wherein obtaining the ground truth object pose comprises computing the ground truth object pose from external measurements and by using RANSAC algorithm.

7. The method of claim 1, wherein obtaining the ground truth object pose comprises computing the ground truth object pose from force sensor measurements.

8. The method of claim 1, wherein generating the plurality of candidate measurement configurations for measuring the object comprises:
sampling the plurality of candidate measurement configurations from a predetermined measurement space by using one or more of Poisson disk sampling, icosahedron subdivision, or stratified sampling technique.

9. The method of claim 8, wherein generating the plurality of candidate measurement configurations for measuring the object further comprises:
adding noise to the plurality of sampled candidate measurement configurations.

10. The method of claim 1, wherein determining the measurement accuracy landscape for the object comprises:
   adjusting a size of the high measurement accuracy region on the measurement accuracy landscape to account for an estimated variance in the estimated object pose.

11. The method of claim 1, wherein determining the measurement accuracy landscape for the object further comprises defining a low measurement accuracy region entry into which by the robot should be avoided when performing pose estimation for the object.

12. The method of claim 1, wherein defining the high measurement accuracy region based on the respective measurement accuracies for the plurality of candidate measurement configurations comprises:
   selecting, from the plurality of candidate measurement configurations for measuring the object, one or more selected measurement configurations associated with respective measurement accuracies that satisfy a predetermined threshold.

13. The method of claim 1, wherein generating the motion plan for manipulating the object in the robotic process that moves the robot, the sensor, or both, through the high measurement accuracy region when performing pose estimation for the object comprises:
   generating a plurality of candidate motion plans for manipulating the robot in the robotic process;
   for each of the plurality of candidate motion plans:
      assigning, based on a spatial relation of the candidate motion plan with respect to the measurement accuracy landscape, a score that is indicative of a maximum measurement accuracy achieved by the robot when performing pose estimation for the object; and
      identifying, according to the scores, a candidate motion plan as the motion plan for manipulating the object in the robotic process.

14. The method of claim 13, wherein the score is further indicative of an overall robot travel distance specified by the motion plan.

15. A system comprising one or more computers and one or more storage devices storing instructions that when executed by the one or more computers cause the one or more computers to perform operations comprising:
   generating a plurality of candidate measurement configurations for measuring an object to be manipulated by a robot in a robotic process;
   determining respective measurement accuracies for the plurality of candidate measurement configurations, comprising, for each of the plurality of candidate measurement configurations:
      determining one or more estimated object poses;
      obtaining a ground truth object pose; and
      computing a respective measure of error for each of the one or more estimated object poses with respect to the ground truth object pose;
   determining a measurement accuracy landscape for the object including defining a high measurement accuracy region based on the respective measurement accuracies for the plurality of candidate measurement configurations; and
   generating a motion plan for manipulating the object in the robotic process that moves the robot, a sensor, or both, through the high measurement accuracy region when performing pose estimation for the object.

16. The system of claim 15, wherein generating the plurality of candidate measurement configurations for measuring the object comprises:
   sampling the plurality of candidate measurement configurations from a predetermined measurement space by using one or more of Poisson disk sampling, icosahedron subdivision, or stratified sampling technique.

17. The system of claim 15, wherein generating the plurality of candidate measurement configurations for measuring the object further comprises:
   adding noise to the plurality of sampled candidate measurement configurations.

18. The system of claim 15, wherein determining the measurement accuracy landscape for the object comprises:
   adjusting a size of the high measurement accuracy region on the measurement accuracy landscape to account for an estimated variance in the estimated object pose.

19. The system of claim 15, wherein defining the high measurement accuracy region based on the respective measurement accuracies for the plurality of candidate measurement configurations comprises:
   selecting, from the plurality of candidate measurement configurations for measuring the object, one or more selected measurement configurations associated with respective measurement accuracies that satisfy a predetermined threshold.

20. The system of claim 15, wherein generating the motion plan for manipulating the object in the robotic process that moves the robot, the sensor, or both, through the high measurement accuracy region when performing pose estimation for the object comprises:
   generating a plurality of candidate motion plans for manipulating the robot in the robotic process;
   for each of the plurality of candidate motion plans:
      assigning, based on a spatial relation of the candidate motion plan with respect to the measurement accuracy landscape, a score that is indicative of a maximum measurement accuracy achieved by the robot when performing pose estimation for the object; and
      identifying, according to the scores, a candidate motion plan as the motion plan for manipulating the object in the robotic process.

21. One or more non-transitory computer-readable storage media storing instructions that when executed by one or more computers cause the one or more computers to perform operations comprising:
   generating a plurality of candidate measurement configurations for measuring an object to be manipulated by a robot in a robotic process;
   determining respective measurement accuracies for the plurality of candidate measurement configurations, comprising, for each of the plurality of candidate measurement configurations:
      determining one or more estimated object poses;
      obtaining a ground truth object pose; and
      computing a respective measure of error for each of the one or more estimated object poses with respect to the ground truth object pose;
   determining a measurement accuracy landscape for the object including defining a high measurement accuracy region based on the respective measurement accuracies for the plurality of candidate measurement configurations; and
   generating a motion plan for manipulating the object in the robotic process that moves the robot, a sensor, or both, through the high measurement accuracy region when performing pose estimation for the object.

* * * * *